United States Patent [19]
Oxenrider et al.

[11] Patent Number: 5,453,477
[45] Date of Patent: Sep. 26, 1995

[54] PROCESS OF POLYMERIZING CHLOROETRIFLUOROETHYLENE WITH ALKYL HYDROPEROXIDE AND METAL METABISULFITE

[75] Inventors: Bryce C. Oxenrider, Florham Park; Frank Mares, Whippany; Mo-Shu Yang, Somerset, all of N.J.

[73] Assignee: AlliedSignal Inc., Morris Township, Morris County, N.J.

[21] Appl. No.: 207,973

[22] Filed: Mar. 7, 1994

Related U.S. Application Data

[63] Continuation-in-part of Ser. No. 140,333, Oct. 18, 1993, abandoned, which is a continuation of Ser. No. 877,558, May 1, 1992, abandoned.

[51] Int. Cl.⁶ .................................................. C08F 4/40
[52] U.S. Cl. ................................... 526/230; 526/249
[58] Field of Search .................. 526/230, 234, 526/227

[56] References Cited

U.S. PATENT DOCUMENTS

| | | |
|---|---|---|
| 2,569,524 | 10/1951 | Hamilton . |
| 2,689,241 | 9/1954 | Dittman et al. . |
| 2,705,706 | 4/1955 | Dittman et al. . |
| 2,783,219 | 2/1957 | Passino et al. . |
| 2,820,026 | 1/1958 | Passino et al. . |
| 3,014,015 | 12/1961 | Jewell . |
| 3,632,847 | 1/1972 | Hartwimmer . |
| 3,640,985 | 2/1972 | Stevens . |
| 3,642,754 | 2/1972 | Yatnka . |
| 3,671,510 | 6/1972 | Kometani et al. . |

OTHER PUBLICATIONS

3"Chlorotrifluoroethylene Polymers", Science & Engineering, 463, 476 (2nd Ed. 1985).

*Primary Examiner*—Christopher Henderson
*Attorney, Agent, or Firm*—Michele G. Mangini; Roger H. Criss

[57] ABSTRACT

Process for the production of PCTFE homopolymer and/or copolymer resins by the use of an aqueous suspension system incorporating a redox initiator system which comprises t-butyl hydroperoxide and sodium metabisulfite to initiate the polymerization or copolymerization process. The process parameters may be controlled to provide a PCTFE homopolymer or copolymer resin having a desired target range of molecular weights. The process provides stable PCTFE polymer suspensions which exhibit a low tendency to coagulate and further exhibit good wettability of the homopolymer and copolymer particles, notably in the absence of soaps.

12 Claims, No Drawings

PROCESS OF POLYMERIZING CHLOROETRIFLUOROETHYLENE WITH ALKYL HYDROPEROXIDE AND METAL METABISULFITE

CROSS-REFERENCE TO RELATED APPLICATIONS

This application is a continuation-in-part of application Ser. No. 08/140,333 filed Oct. 18, 1993, abandoned, which is a continuation of application Ser. No. 07/877,558 filed May 1, 1992, (abandoned).

BACKGROUND

1. Field of the Invention

The present invention relates to improved processes for the production of polychlorotrifluoroethylene homopolymers and copolymers; more particularly the present invention provides a novel redox system for the production of polychlorotrifluoroethylene homopolymers and copolymers which may be ultimately used in the formation of formed articles, i.e. films, resins, thermoformed articles, and the like wherein the polychlorotrifluoroethylene homopolymers and copolymers produced according to the present invention feature among other attributes, improved processability. The improved production process further provides an aqueous shelf stable suspension of polychlorotrifluoroethylene homopolymers and copolymers.

2. Description of the Prior Art

The preparation of solid polymers of polychlorotrifluoroethylene (hereinafter sometimes referred to as "PCTFE") is well known to the art as well as are PCTFE materials which further comprise copolymers including but not limited to CTFE-vinylidene fluoride, CTFE-tetrafluoroethylene, as well as CTFE-ethylene copolymers. These materials are described in detail, for example, in the *Encyclopedia of Polymer Science and Engineering*, Sec. Ed. Vol. 3, at Page 463, Pub. John Wiley and Sons. As therein described, articles and films formed from PCTFE materials exhibit desirable vapor barrier properties, good thermal stability and resistance to strong oxidizing agents.

There are presently known a plurality of processes which were suitable for the formation of the homopolymer, polychlorotrifluoroethylene. High molecular weight homopolymers and copolymers of PCTFE may be prepared by free radical initiated polymerization either as bulk, suspension, or aqueous emulsion via the use of a suitable initiator system or in the alternative by ionizing radiation.

For the formation of PCTFE in an aqueous suspension process, a redox initiator system which comprises, for example, an alkaline metal persulfate as an oxidant, an alkaline metal bisulfite as a reductant, and metal salts such as ferrous sulfate, silver nitrate, or copper sulfate, which are known to be useful as accelerators to the redox reaction, may be used.

For the production of PCTFE by emulsion polymerization, emulsifiers, generally fluorocarbon and chlorofluorocarbon compatible emulsifiers, may be used.

For the formation of PCTFE by bulk polymerization, a peroxide may be used as an initiator. Of particular note, useful peroxides which may find use are one or more of the group of: trichlor-acetal-peroxide, dichlorotrifluoro-propionyl peroxide, heptafluorobutyryl peroxide, as well as other acyl peroxides derived from fluorocarboxylic acids.

Also known to the art is the formation of copolymers of PCTFE, such as copolymerized PCTFE with vinylidene fluoride and/or tetrafluoroethylene which may be produced by either suspension or emulsion polymerization processes. Generally, however, the use of comonomers is such that the weight percentage of the comonomers is relatively low, i.e., generally comprising a minor proportion of the total polymer as it is known that the desirable vapor barrier properties are substantially degraded by the inclusion of excessive amounts of comonomers.

Other methods for the production of PCTFE homopolymers and copolymers (which are sometimes hereinafter generally referred to as "PCTFE polymers") include the processes for the production of PCTFE film forming and copolymer resins as described in U.S. Pat. Nos. 2,705,706; 2,689,241; 2,569,524; 2,783,219; 2,820,026; 3,640,985; 3,671,510; 3,642,754; 3,632,847; and 3,014,015.

While these processes provide useful methods for the production of PCTFE polymer resins, various shortcomings in one or more of these processes have compelled the development of further novel methods for the production of PCTFE polymer resins.

One such shortcoming in the prior art is the encapsulation of inorganic moieties from the initiating species which are known to produce a PCTFE polymer resin with a relatively high content of residual ash, which limits the range of applications within which articles formed using the PCTFE polymer resin may be used. Such materials are known to have lower dielectric strengths which is often undesirable for use in electrical and electronic devices and/or packaging.

A further shortcoming in the prior art is that processes which may be used to form suspensions of PCTFE polymer resins typically require the use of a soap or a surfactant composition.

Therefore, it will become apparent to those skilled in the art that there remains a present and continuing need for the provision of improved PCTFE homopolymers and copolymers which are suitable for the production of formed articles therefrom, or to be included in the structure of a formed article. There also remains a continuing need in the art for the production of improved PCTFE homopolymers and PCTFE copolymers which feature improved machine processability, particularly in regard to conventional thermoforming and process equipment.

SUMMARY

The present invention includes improved PCTFE polymer resins, particularly PCTFE homopolymer and copolymer compositions, and processes for the production of improved PCTFE homopolymer and copolymer compositions.

In accordance with this invention, there is provided a process for forming poly(chlorotrifluoroethylene) or a copolymer of chlorotrifluoroethylene and at least one copolymerizable monomer which comprises the steps of:

(a) forming a polymerization reaction mixture comprising a monomer selected from the group consisting of chlorotrifluoroethylene or a combination of chlorotrifluoroethylene and at least one copolymerizable monomer and a redox initiator system comprising a mixture of an alkyl hydroperoxide and an alkali metal metabisulfite in a reaction solvent comprising water; and (b) polymerizing the monomer while maintaining the mixture at a controlled temperature to form an aqueous suspension of the poly(chlorotrifluoroethylene) or the copolymer.

Also in accordance with this invention, there is provided an aqueous suspension of poly(chlorotrifluoroethylene) or a copolymer of chlorotrifluoroethylene and a copolymerizable monomer produced by the above process, as well as such polymer or copolymer produced by such process. Moreover, this invention provides articles formed of such polymer and copolymers, including articles in which such polymer or copolymer are present in at least one layer.

In one aspect of the present invention there is provided a process for the production of PCTFE homopolymer resins and/or PCTFE copolymer resins by the use of an aqueous suspension system incorporating a novel redox initiator system which comprises t-butylhydroperoxide and sodium metabisulfite to initiate the polymerization or copolymerization process. The parameters of the process may be controlled to provide a PCTFE resin having a desired target range of molecular weights.

In a further aspect of the instant invention there are provided shelf stable PCTFE polymer suspensions; these suspensions exhibit a low tendency to coagulate and further exhibit good wettability of the PCTFE homopolymer and copolymer particles, notably in the absence of soaps.

It has also been determined that iron ions need to be present during the polymerization reaction. If the reaction vessel is stainless steel, there usually is sufficient interaction with the iron ions in the vessel walls so that the separate addition of an iron-containing compound is not required. However, where a glass-lined reactor is employed, it has been found that iron ions need to be added. The amount of iron ions present during the polymerization reaction may range from about 10 to about 1000 ppm (based on the weight of the polymer) and more preferably from about 50 to about 500 ppm.

In further aspects of the present invention there is provided a PCTFE polymer resin produced by the aqueous polymerization of comonomers utilizing a redox reaction of tert-butyl hydroperoxide and sodium metabisulfite; and control of the various constituents and the reaction condition provides for the controlled production of PCTFE polymer resins having a desired molecular weight and desired molecular weight distribution.

In a still further aspect of the present invention there are provided PCTFE polymer resin compositions which may be readily formed using conventional process equipment into formed shapes, film, sheets, as well as other thermal formed article. In the alternative, the PCTFE polymer resin composition formed by the process described herein may also be used to form one layer of a construction of an article, i.e., forming a barrier layer within a multilayer film structure or forming a barrier layer within a formed article.

These and other aspects of the present invention will become more apparent by reference to the specification following and the accompanying examples presented herein.

DESCRIPTION OF THE INVENTION AND THE PREFERRED EMBODIMENTS

The present invention provides for a novel process for the production of PCTFE polymer resins, which resins include both PCTFE hompolymer resins as well as PCTFE copolymer resins. Generally, the PCTFE copolymer resins are PCTFE copolymers which may consist of up to about 50% by weight of at least one additional copolymerizable comonomer, including but not limited to: vinylidene fluoride, tetrafluoroethylene, and/or ethylene. It is to be clearly understood that plural copolymerizable comonomers may be used. The present invention further provides articles made from such PCTFE polymer resins which articles feature improved vapor barrier characteristics, improved machine processability, and which feature reduced encapsulated ash content in their composition.

In a further aspect, the present invention includes a process for the production of a PCTFE homopolymer composition consisting essentially of a homopolymer having a desired molecular weight and which further exhibits a low residual ash content when compared to the redox processes of the prior art. The process of this invention utilizes the redox initiator system outlined above and further provides for the variance of the process conditions so to provide an effective process for a PCTFE polymer resin having a desired molecular weight within the range of 10,000 to 5,000,000.

Further disclosed are processes for the production of articles and structures which include at least one layer of the PCTFE polymer resin, which articles and structures feature resultant improvements in vapor barrier characteristics. Such PCTFE resin compositions as taught herein provide improved vapor barrier characteristics and improved machine processability and impart such characteristics to articles and structures of which they form a part, and impart improved processability of said PCTFE polymer resin.

Also disclosed in the present specification are shelf stable suspensions which include PCTFE homopolymers and/or PCTFE copolymers which exhibit a low tendency to coagulate, and which are easily remixed, thus allowing for the suspension to be maintained indefinitely.

In accordance with present invention, there is provided a oxidation-reduction, i.e., "redox", process for the polymerization of chlorotrifluoroethylene which may be generally described as having a chemical formula of $CF_2=CFCl$. Chlorotrifluoroethylene is readily commercially available or may be produced by conventional process techniques.

In accordance with the present invention, the oxidation-reduction system includes the use of tert-butyl hydroperoxide, and sodium metabisulfite as reaction initiators.

Tert-butyl hydroperoxide (interchangeably referred herein to as "TBH"), may be represented as having the structure $(CH_3)_3COOH$.

Sodium metabisulfite (interchangeably referred to herein as "MBS") may be characterized as having the structure $Na_2S_2O_5$.

Both the TBH and the MBS may be provided in varying amounts for use in the polymerization of the CTFE homopolymers in a manner conventional to that used for other redox initiator systems used in the aqueous polymerization of PCTFE homopolymers and copolymer materials.

While it is to be understood that other process conditions may be used and the benefits of the present invention still realized, in, accordance with a preferred embodiment of the present invention, a quantity of chlorotrifluoroethylene, generally in a liquid form at room temperature, i.e., 20° C., is charged into a heatable reactor vessel which contains degassed deionized water. The reactor is a closed vessel capable of withstanding internal pressure of at least 300 psi, preferably at least 1000 psi and is provided with a mechanical agitator which effectuates thorough mixing of the reactor contents. The heatable reactor vessel is also provided with a heat source which is capable of raising and lowering the temperature of the reactor vessel contents to the required reaction temperature while the reactants contained within the reactor vessel are agitated. The reactor vessel contents are raised to a temperature within the range from about 0° C. to about 75° C. or less. Also added to the reactor vessel is a dilute aqueous solution of TBH and a dilute aqueous solution of MBS.

As mentioned above, the presence of iron ions is needed to be present in the reactor. When iron is added, it may be in the form of ferrous sulfate, for example. In this case, it may be conveniently added together with the MBS stream.

The reaction is allowed to proceed until the liquid monomer is consumed, or in the alternate when there is noted a pressure drop in the reactor vessel which usually indicates the consumption of the liquid CTFE monomer within the reaction vessel. In accordance with the process of this invention, it has been found that the control of the reaction temperature is an important factor for establishing the final molecular weight of the PCTFE homopolymers being formed, as well as the reaction rate. It has been observed that generally the reaction temperature should not be allowed to exceed the range of between about 0° C. to about 75° C., and preferably should not be allowed to exceed between 5° C. and about 60° C.

In alternative embodiments of processes according to the instant invention, the liquid CTFE polymer may be charged continuously to the reactor during the course of the reaction so to provide a constant reaction rate, or alternately may be charged in a batchwise manner, in one or more batches, at any time during the course of the reaction. It is also contemplated that other water soluble hydroperoxides may be used in the stead of or in addition to the TBH and MBS described above. Further, the form of the reactor is not critical to the practice of process taught herein.

The process generally comprises the following steps: (a) charging the constituents to the reactor vessel, either in an initial batch or in a continuous manner during the course of the reaction, or in a semi-continuous manner, (b) initiation of the oxidation reduction reaction and maintaining a controlled temperature throughout the reaction process, (c) allowing the reaction to proceed until the desired polymerization product is achieved.

In accordance with step (a) of the process outlined above, any quantity of the CTFE monomer and optionally any additional comonomer is charged to a suitable reactor vessel. The constituents may be charged initially, or in a continuous manner during the course of the reaction, or in a semi-continuous manner. By "semicontinuous" is meant that a plurality of batches of the CTFE monomer and optionally any additional comonomers are charged to the reactor during the course of the polymerization reaction. A suitable reactor vessel includes but is not limited to conventional kettle type reactors, flasks, as well as any other sealable vessel which may be successfully used for the polymerization process. Of these the most preferred are conventional reactor kettles which are sealably closed and which may be pressurized to the required reaction pressures and preferably in excess of for safety considerations.

The constituents may be selected in quantities which are similar to those used for other redox or initiator type systems for the production of PCTFE polymers. By this it is to be understood that the specific redox system taught in the present specification may be used to substitute for other redox initiator type systems for other processes presently known in the art.

The proportion of the TBH and the MBS is critical to the success of the present invention but need be present in only an amount sufficient to successfully initiate the polymerization of the CTFE monomer and any additional copolymerizable comonomers within the reactor vessel when the reactor contents are brought to their process conditions, and preferably the specific process conditions being outlined herein. Generally the concentration of the TBH should be between about 0.01 grams to 10 grams per 100 ml of water at 20° C.; preferably the TBH is present between about 0.1 grams and 5 grams per 100 cc of water at 20° C. The MBS is preferably present in an amount between about 0.01 grams to about 15 grams per 100 cc of water at 20° C.; preferably the MBS is present between about 0.1 grams and 5 grams per 100 cc of water at 20° C.

In subsequent process step (b) the sealed reactor and its contents are heated or cooled to the reaction temperature, or alternately to a varying temperature profile which varies the temperature during the course of the reaction. The range of reaction temperatures is preferably between about 20° C. up to and including about 75° C., although temperatures above and below these values are also contemplated.

The present inventors have found that the control of both the temperature and the concentration of the initiator are important to the ultimate molecular weight of the final PCTFE polymer product produced. The present inventors have found that at relatively higher reaction temperatures, a lower molecular weight product is produced, which effect is believed to be the result of more chain transfer in the reactor vessel. At relatively higher initiator concentrations, a lower molecular weight product is produced, which effect believed to be the result of the production of more chains. In light of these results, the inventors have found that control of the reaction conditions to maintain a relatively higher reaction temperature and a relatively high initiator concentration provides the lowest molecular weight PCTFE polymer resin, while maintenence of a relatively low temperature and a relatively low concentration of the initiator, provides the highest molecular weight PCTFE polymer resin. Thereby, the inventors have found that variation of the reaction temperature is an important factor in the production of a PCTFE polymer resin, and that control of the reaction temperature to a specified temperature is influential in determining the ultimate molecular weight of the resultant PCTFE polymer resin being produced utilizing the types of redox system being taught herein. It will be apparent to the skilled practitioner that for a PCTFE polymer resin having a desired molecular weight, that appropriate reaction conditions, viz., initiator concentration and reaction temperature, may be readily determined by conventional experimental techniques without undue experimentation, particularly in light of the Examples presented below.

Further, the present inventors have found that variation of the reaction temperature during the polymerization of the PCTFE homopolymer or PCTFE copolymer may result in a PCTFE polymer resin which has specific concentration of PCTFE polymer resins within particular ranges of molecular weight. By way of example, initially establishing the temperature of the reactor contents as a higher temperature, such as 50° C., and subsequently reducing the temperature and pressure of the reactor to a relatively lower pressure and temperature, such as 20° C. during the course of the reaction will provide a PCTFE polymer resin suspension which comprises PCTFE polymer resin of plural molecular weight range distributions; higher reactor pressure and temperature at the initiation of the reaction will provide a PCTFE polymer resin having a relatively higher molecular weight, and subsequent operation of the reactor temperature and pressure during the course of the reaction provides a PCTFE polymer resin having a relatively lower molecular weight. In a similar manner, the reaction conditions described immediately above may be reversed; e.g, lower initial temperature and pressure, followed by elevation of the temperature and pressure as the comonomers are consumed. Control of the temperature and pressure during the course of the polymerization reaction thereby provides a process for the production of PCTFE polymer resins which have particular molecular weight ranges.

In accordance with this process step, temperature control is exerted upon the reactor vessel and its contents and such a desired temperature is set and maintained throughout the polymerization reaction. Any effective apparatus which provides the necessary cooling means to the reaction vessel and to the reactor contents may find use in conjunction with the inventive process being taught herein. Any conventional temperature control means may be used, such as those which include a temperature controller cooperatively operating with a heat source or heat sink, to provide or withdrawn heat from the reactor. One preferred example is a conventional temperature controlled bath within which the reactor is at least partially immersed. During the heating or cooling process, it highly desirable that the agitator means be energized and remain energized throughout the reaction so to provide constant stirring of the reactor vessel contents to insure good mixing of the reactor contents.

During the process step (b) the reactor pressure is modified only by the change in the internal pressure occasioned by the polymerization process itself. Desirably, a pressure sensing means be present in the reactor vessel so to provide an indication of the pressure of the vapor annulus within the reactor vessel, as the present inventors have found that a reduction in the vapor pressure within the vessel subsequent to the initiation of polymerization is the indicator that a substantial portion of the CTFE monomer has been polymerized. Subsequent to the process step (b), whether it has been determined either by monitoring the pressure drop, by calculation of the reaction time, or any other time desired, the reaction vessel is vented and subsequently unsealed.

The present inventors have surprisingly found that the polymerized CTFE in the reaction vessel is a stable aqueous suspension of PCTFE polymer resin which comprises suspended PCTFE polymer resin particles, generally in the size range of between about 0.01–1 micron. In addition, the particle size is very uniform in each batch (such as between about 0.2 to 0.25 micron). The polymer may be removed from the reactor and subsequently the water is driven off by any conventional means including evaporating, freeze-drying the aqueous suspension, or any other means, such as by the optional addition of a minor amount of an agglomerating or coagulating agent followed by filtration or centrifuging. The present inventors have further found the PCTFE polymer resin suspension is highly stable and exhibits good shelf stability, generally in excess of several weeks when a suspension is left undisturbed upon standing. Further, the present inventors have observed that after a PCTFE polymer resin suspension is left standing, it will eventually separate into a lighter aqueous phase, and a heavier precipitate phase which however may be readily reconstituted into a stable suspension by mixing these two phases whereupon, the PCTFE polymer resin suspension reforms, and has been found to once again be highly stable and will remain stable once again for several weeks when a suspension is left undisturbed upon standing. The PCTFE polymer resin suspension may be allowed to separate, and then reconstituted into the PCTFE polymer resin suspension by agitation indefinitely.

The present inventors have also surprisingly found that the suspended PCTFE polymer particles formed according to the process taught herein are readily agglomerable from the suspension formed within the reactor but do not require the use of large amounts of a coagulating agent. Such coagulating agents are typically acids, or monovalent or polyvalent salts. As is known to the art, the addition of such coagulating agents, especially in large amounts is frequently undesirable as they introduce ash into the polymer resin, and frequently require extensive washing for their removal in a subsequent step. This may be further complicated by the fact that the PCTFE particles formed by prior art production methods may be hydrophobic in their behavior.

The suspended PCTFE polymer resin particles are agglomerated within the aqueous suspension by the introduction of relatively minor amounts of a coagulating agent and the reactor contents stirred to effect the agglomeration. Suitable coagulating agents include any coagulating agent or composition which are known to the art as effective in agglomerating PCTFE resin compositions, such as by the use of monovalent or polyvalent metal salts but are preferably dilute aqueous solutions of aluminum sulfate, $Al_2(SO_4)_3 \cdot 18\ H_2O$, magnesium sulfate, $MgSO_4$, calcium chloride, $CaCl_2 \cdot 2\ H_2O$ as well as $AlCl_3 \cdot 6\ H_2O$. The concentration of these materials used to form the aqueous solutions are generally in the range of 1% by weight and less based on the polymer. An advantageous feature of the use of such coagulant compositions in conjunction with the PCTFE polymer resin suspensions taught herein is that such suspensions and their resulting PCTFE polymer resin compositions generally have essentially zero free ash (as on the order of 0 to 30 ppm). The rest of the cations present depend on the molecular weight of the polymer; the lower the molecular weight the higher is the content of sulfonic acid ends groups. The cations that are bound to the polymer depend on the degree of neutralization of the sulfonic acid end groups. Such PCTFE polymer resin compositions are believed to be particularly useful in the production of formed and molded articles which are capable of being utilized in applications wherein contact with a foodstuff, medicament or imbibable composition is to be anticipated.

The PCTFE polymer resin may then be dried to provide a white free flowing particle composition consisting essentially of PCTFE polymer resin and any residual ash from the polymerization process. The intrinsic viscosity of the PCTFE polymer resin may be determined by conventional techniques, for example, by determining the intrinsic viscosity of a sample of the resin in a solvent such as 2,5-dichlorobenzotrifluoride wherein the intrinsic viscosity of the sample may be correlated to the numerical average molecular weight by the relationship:

$$[\eta] = .15 \times 10^{-5} (M_n)^{0.74}$$

wherein "$(M_n)$" represents the number-average molecular weight. The intrinsic viscosity is determined at temperature sufficient to maintain the polymer is solution. For PCTFE resins, 2,5-dichlorobenzotrifluoride at 135° C. provides a useful reference. This method is more fully described in the *Encyclopedia of Polymer Science and Engineering*, 2nd. Ed. Vol. 3 at page 476, published by John Wiley and Sons.

A further testing method of determining the molecular weight of the PCTFE polymer resin compositions may be in accordance with the specifications outlined in ASTM-D 1430-81 from which a "Zero Strength Time", or "zst" is valuated. Briefly, ASTM-D 1430-81 utilizes a compression molded test sample formed of the PCTFE polymer resin having dimensions of about 1.6 mm by 4.8 mm by 5.0 mm and which has a dual "v" shaped notch in the central portion of the test sample. The sample is suspended from one end with a 7.5 gram weight suspended from the other end in an oven at 250° C. The zst value is the time in seconds after which the sample breaks.

Whereas the present specification has described in substantial detail the formation of the PCTFE polymer resin by use of the described redox system, it is to be clearly understood that the incorporation of comonomers including but not limited to vinylidene fluoride, tetrafluoroethylene and/or ethylene, may be utilized to form copolymers and terpolymers comprising the PCTFE described throughout this specification. Of these materials, the formation of PCTFE-vinylidene fluoride copolymers, and PCTFE-tetrafluoroethylene copolymers, and PCTFE-vinylidene fluoride, tetrafluoroethylene terpolymers are particularly contemplated.

The compositions formed from the reaction taught herein following the process steps outlined may be used ultimately to form a variety of materials and articles in accordance with conventional processing techniques. By way of example, not by limitation, conventional processing techniques include any thermoforming technique wherein the PCTFE polymer resin is melted and/or plasticated and formed into an article or alternatively where the PCTFE polymer resin is applied to an article by technique which does not melt or plasticate it during its application. Examples of the former include conventional extrusion techniques, for the formation of fibers, strands, pellets, as well as formed profile shapes, and the like, as well as the formation of films, sheets, plates, by extrusion techniques through a flat film type die or by blown film methods, casting techniques wherein a billet of the PCTFE polymer resin is formed and an ultimate article is cut or profiled or otherwise derived from the billet, such as skiving film therefrom, as well injection and compression molding techniques wherein the plasticated PCTFE polymer resin composition is formed into a die or a mold of the latter. It is further contemplated that the shelf stable PCTFE polymer resin suspension taught herein may be incorporated into a variety of compositions which may be ultimately used in the formation or treatment of articles. Examples of such compositions include coatings including those useful in conjunction with films, molded articles and parts, extruded profiles, fabrics, fibers, as well as formed or molded articles including those which include polymer materials, metals, ceramics, as well as others not particularly recited here. The coating compositions may be physically applied onto a surface such as by spraying, coating, dipping, and the like.

The invention is more easily understood by reference to specific embodiments which are representative examples according to the teachings of the instant invention. It must be understood, however, that the specific embodiments discussed herein are provided only for the purpose of illustration, and not by way of limitation, and it is to be further understood that the invention may be practiced otherwise than specifically described and yet be within the inventive scope.

EXAMPLES

In accordance with the teaching of the present specification a plurality of PCTFE polymer resins, both PCTFE homopolymer resins and PCTFE copolymer resins were produced. For the production of PCTFE copolymer resins, amounts of vinylidine fluoride were used as the comonomer.

Various process conditions including variation of the temperatures, starting monomers as well as different batch sizes were utilized in the production of the PCTFE polymer resins and are indicative of the broad range of process conditions within which the present invention may be practiced; exemplary process conditions are outlined in the Examples below.

Polymerization Process Conditions - 4 Liter Reactor

A pressurizable stainless steel reactor having an internal volume of four liters equipped with a mechanical stirrer, and conventional inlet and outlet ports was used. The mechanical stirrer comprised a rotatable shaft fitted with two sets of four blades each, wherein each set of blades may be generally described as flat paddle blades set at an angle of approximately 45° relative to the shaft. The two sets of blades were located upon the shaft with a proximal spaced-apart distance of approximately six inches, and further, direction of the angle of each of one set of blades was in a direction opposite to that of the other set of blades; such a configuration desirably ensured the most effective mixing of the reactor contents. The other end of the shaft was affixed to an electric motor which is used to rotate the shaft. The reactor was further provided with a temperature control system which included a heating bath which operated in conjunction with a temperature controller to assure the maintenance of a desired temperature within the reactor.

In the production of a PCTFE resin, in a first process step approximately 1700 ml of degassed deionized water at a temperature in the range 5° C. to 55° C. was charged to the sealed reactor through an inlet port and subsequently the gas space within the reactor was purged with nitrogen so to remove any residual atmospheric oxygen. Thereafter, in the case of the production of a PCTFE homopolymer, approximately 320 ml of liquid chlortifluoroethylene ("CTFE") was metered into the reactor through an appropriate liquid inlet port; in the case where the production of a PCTFE copolymer was to be produced, approximately 320 ml of liquid CTFE and the appropriate mass proportion of the comonomer, such as $VF_2$ (vinylidine fluoride), was also provided at this time. The temperature control system was activated to assure that the reactor and its contents were brought to a desired reaction temperature, and the mechanical stirrer was activated so to maintain a constant speed of 700 rpm throughout the polymerization process. Previously prepared degassed aqueous solutions of TBH and MBS were then metered into the reactor at a predetermined rate to initiate the polymerization of the monomer constituents. Optionally, in certain cases, the use of a small amount of iron in the form of $FeSO_4 \cdot 7 H_2O$ was also introduced into the reactor.

The polymerization of the monomer constituents was allowed to proceed until the total designated time had lapsed, or until a drop in the pressure of the gas within the reactor was noted at which time the addition of the initiator was stopped and then stirring continued for an additional time period of about 30 minutes.

Upon the completion of polymerization, the reactor vessel was vented, flushed with gaseous $N_2$, and opened to yield a stable aqueous suspension of polymer particulates. These particulates were finely divided and generally had a mean particle diameter of about 0.1 to about 0.2 microns. In order to facilitate the separation of the particles in the subsequent centrifuging operation, a coagulating agent known as useful with PCTFE polymers was used. The specific coagulating agents were one of the following:

| Type: | Coagulating Agent: |
|---|---|
| A | $AlCl_3.6H_2O$ |
| B | $Al_2(SO_4).18H_2O$ |
| C | $CaCl_2.2H_2O$ |
| D | $MgSO_4$ |
| NaCl | sodium chloride |
| HCl | hydrochloric acid |

These coagulating agents were added in the form of an aqueous solution in amounts, generally about 1–5 grams dissolved in 200 ml of water to the reactor contents and stirred until the particles were agglomerated. Generally, the time required varied between minutes to about 3 hours.

The contents of the reactor were then provided to a conventional bench top centrifuge with a five inch stainless steel perforated basket which was operated to separate the liquid portion of the reactor contents from the solid polymer particulates which were collected in a fitted polyethylene terepthalate bag. A batchwise manner of operation was used as the available centrifuge did not have the capacity to simultaneously separate and wash all of the polymer particles in one batch. The collected particulates were subsequently washed on the centrifuge with two to four liters of purified deionized water, and then dried upon a glass tray in a circulating air oven at a temperature of 100° C. for a period of 14–18 hours.

The polymer particles recovered were caked, but could be ground into a dry, fluffy free-flowing powder.

Polymerization Process Conditions - 10 Gallon Reactor

A stainless steel pressurizable reactor having an internal volume of 10 gallons and equipped with a mechanical stirrer, and with conventional inlet and outlet ports was used. The mechanical stirrer comprised a rotatable shaft fitted with two sets of four blades each having a configuration generally the same as was described for the process utilizing the four liter reactor, and a jacketed temperature control system as well.

The production of PCTFE resins was generally in accordance with the procedure outlined in conjunction with the description of the polymerization process used with the four liter reactor; approximately 24–25 liters of purified degassed water were used, and a further distinction was that the stirrer was operated to rotate at 350 rpm in the 10 gallon reactor.

Upon the completion of polymerization, the reactor vessel was flushed with $N_2$, vented and opened to yield a suspension of polymer particles. A two liter aliquoit was subsequently coagulated as described above, then centrifuged and washed in a batchwise manner in a conventional centrifuge as outlined above; a batchwise manner was used as the centrifuge did not have the capacity to simultaneously separate and wash all of the polymer particles. The polymer particle yield was dried as outlined above, and yielded a dry cake which could be easily ground into a free-flowing powder.

Evaluation of the Polymer Reaction Product

The dried polymer particles were quantitatively evaluated and characterized.

The intrinsic viscosity of the polymer was determined in accordance with the conventional technique utilizing a solution of the polymer in 2,5odichlorobenzotrifluoride at 135° C.

The number-average and weight-average molecular weight was determined utilizing a Waters Model 150-C Gas Pressure Chromatograph using a Zorbax trimodal column having 3000Å, 300Å, and 60Å diameter pores in conjunction with a viscosity detector which utilized a 0.1% solution of the particular polymer being tested in 2,5- dichlorobenzotrifluoride at a temperature of 145° C. and a flow rate of 1 ml/minute. The "heterogeneity index" of the polymer is determined to be the ratio of weight average molecular weight (Mw) divided by the number average molecular weight (Mn).

The melt viscosity of the particular polymer sample being evaluated was performed using a Rheometric Dynamic Spectrometer using 25 mm diameter disks in parallel plate mode. First, a test disc having a thickness of approximately 3–4 millimeters was allowed to equilibrate at 240° C. for 5 minutes. Subsequently the polymer sample was evaluated in conjunction with conventional evaluative procedures; a frequency sweep from 500 to 0.1 radians/sec with a 2% strain.

The viscosity was reported at 0.1 radians/second, and the total time for the test was 10 minutes.

Example Compositions

Examples 1–3: As is particularly described on Table 1, reaction conditions, the specific quantities of the comonomers, here both CTFE and varying amounts of the comonomer $VF_2$ were provided to the four liter reactor and processed in accordance with the procedure described under the heading "Polymerization Process Conditions - 4 Liter Reactor" above, and evaluated in accordance with the general guidelines outlined above under the heading "Evaluation of the Polymer Reaction Product". The polymers produced in accordance with the various process conditions were evaluated, and the results of such evaluation is outlined on Table 2, following.

TABLE 1

| | | | | 4 liter reactor | | | | | | | |
|---|---|---|---|---|---|---|---|---|---|---|---|
| | | | | Temp | TBH | | MBS | | Reaction | Pressure | |
| Example: | CTFE (ml) | VF2 (g)* | Fe (g) | (deg. C.) | initial: | g/hr: | initial: | g/hr. | Time (hrs): | initial: | final: |
| 1 | 320 | 15 | 0 | 40 | 0.035 | 0.016 | 0.038 | 0.17 | 8.5 | 156 | 118 |
| 2 | 410 | 20 | 0 | 40 | 0.035 | 0.016 | 0.04 | 0.017 | 8 | 156 | 74 |

TABLE 1-continued

| | | | | 4 liter reactor | | | | | | | |
|---|---|---|---|---|---|---|---|---|---|---|---|
| | | | | Temp | TBH | | MBS | | Reaction | Pressure | |
| Example: | CTFE (ml) | VF2 (g)* | Fe (g) | (deg. C.) | initial: | g/hr: | initial: | g/hr. | Time (hrs): | initial: | final: |
| 3 | 320 | 15 | 0 | 50 | 0.084 | 0.034 | 0.00 | 0.37 | 5.5 | 198 | 187 |
| 4 | 320 | 15 | 0 | 40 | 0.084 | 0.034 | 0.08 | 0.037 | 5.75 | 156 | 80 |
| 5 | 320 | 15 | 0 | 30 | 0.06 | 0.034 | 0.064 | 0.036 | 6.8 | 120 | 42 |
| 6 | 320 | 15 | 0 | 40 | 0.06 | 0.034 | 0.064 | 0.036 | 8.5 | 156 | 118 |
| 7 | 320 | 15 | 0.06 | 50 | 0.06 | 0.034 | 0.21 | 0.042 | 8 | 198 | 171 |
| 8 | 320 | 15 | 0.06 | 55 | 0.06 | 0.034 | 0.21 | 0.042 | 8.5 | 219 | 56 |
| 9 | 320 | 15 | 0 | 55 | 0.06 | 0.034 | 0.21 | 0.042 | 10 | 219 | 51 |
| 10 | 320 | 0 | 0 | 20 | 0.06 | 0.034 | 0.074 | 0.035 | 13.5 | 77 | 67 |
| 11 | 320 | 15 | 0 | 50 | 0.105 | 0.05 | 0.12 | 0.058 | 6.8 | 200 | 65 |
| 12 | 200 | 10 | 0 | 50 | 0.105 | 0.05 | 0.12 | 0.058 | 4 | 194 | 62 |
| 13 | 200 | 10 | 0 | 50 | 0.105 | 0.03 | 0.12 | 0.058 | 6 | 188 | 62 |
| 14 | 320 | 0 | 0 | 10 | 0.05 | 0.017 | 0.055 | 0.02 | 26 | 59 | 59 |

*: "VF2" is vinylidine fluoride

TABLE 2

| | | | | 4 liter reactor | | | | |
|---|---|---|---|---|---|---|---|---|
| Example: | Coagulant type: | Polymer recovered (g): | Intrinsic Viscosity: | Ash cont.: (ppm) | Mw + $(1 \times 10^3)$: | Mn ++ $(1 \times 10^3)$: | Hete.*+ Index: | Melt Viscosity $(1 \times 10^5$ Pa Sec): |
| 1 | — | 327 | 1.08 | <35 | 461 | 124 | 3.7 | 6.5 |
| 2 | — | 446 | 1.13 | <35 | 510 | 140 | 3.6 | 8.7 |
| 3 | A | 210 | 0.64 | 71 | 360 | 160 | 2.25 | 1 |
| 4 | NaCl | 373 | 0.87 | 10,000 | 370 | 90 | 4.11 | — |
| 5a | B | 126 | 1.17 | 309 | 600 | 210 | 2.86 | — |
| 5b | A | 172 | 1.18 | 62 | 590 | 180 | 3.28 | — |
| 6 | B | 315 | 1.1 | 73 | 600 | 310 | 1.94 | 7.9 |
| 7 | B | 295 | 0.79 | 126 | 390 | 135 | 2.89 | 2 |
| 8 | B | 395 | 0.58 | 112 | 310 | 80 | 3.9 | 0.5 |
| 9 | B | 435 | 0.61 | 73 | 340 | 110 | 3.1 | 0.73 |
| 10 | B | 395 | 0.83 | 109 | 450 | 225 | 2 | 2.4 |
| 11 | B | 425 | 0.79 | ... | 450 | 190 | 2.37 | 2.3 |
| 12 | HCl | 276 | 0.68 | <35 | 375 | 180 | 2.1 | 0.73 |
| 13 | C | 425 | 0.83 | 210 | 400 | 170 | 2.4 | 5.7 |
| 14 | C | 350 | 1.16 | 283 | 530 | 230 | 2.3 | 19.4 |

+: Mw is weight average molecular weight
++: Mn is number average molecular weight
*+: Heterogeneity Index = Mw/Mn Example 4: The reaction was carried out as per Examples 1–3, but the reactor contents further included the addition of 3.5 grams of $CHCl_3$ which was included to evaluate its use as a chain transfer agent. Evaluation results are outlined on Table 2.

Example 5: The comonomers CTFE and $VF_2$ were provided to the four liter reactor and processed in accordance with the procedure described under the heading "Polymerization Process Conditions - 4 Liter Reactor" above, and evaluated in accordance with the general guidelines outlined above under the heading "Evaluation of the Polymer Reaction Product". The polymer produced in the reactor was divided into two portions, and evaluated and reported as samples labeled "5a" and "5b". The results of the evaluation are outlined on Table 2.

Example 6: The comonomers CTFE and $VF_2$ were provided to the four liter reactor and processed in accordance with the procedure described under the heading "Polymerization Process Conditions - 4 Liter Reactor" above and within the process constraints outlined on Table 1, with the additional distinction that 1530 ml of purified deionized water and 170 ml of glacial acetic acid were included in the reactor in the place of the 1700 ml of purified deionized water. The polymer produced was evaluated as per Examples 1–3, and the results are outlined on Table 2.

Examples 7–8: The comonomers CTFE and $VF_2$ and a minor amount of an iron compound, ferrous sulfate ($FeSO_4 \cdot 7H_2O$) were provided to the four liter reactor and processed in accordance with the procedure described under the heading "Polymerization Process Conditions - 4 Liter Reactor" above and within the process constraints outlined on Table 1. The resultant polymer was recovered, dried and evaluated with the results as outlined on Table 2.

Examples 9–14: Compositions comprising CTFE monomers with and without the comonomer $VF_2$ were produced according to the guidelines given above in the four-liter reactor; the resultant polymer product was evaluated and the evaluation results are outlined on Table 2.

Examples 15–17: The polymer compositions according to these examples were produced utilizing the procedures described above under the heading "Polymerization Process Conditions - 10 Gallon Reactor" as outlined above and utilizing the specific constituents and conditions particularly described in Table 3, below.

The resultant polymers are recovered and evaluated in accordance with the procedures outlined described under the heading "Evaluation of the Polymer Reaction Product" and the results of such evaluations are outlined on Table 4, below.

Example 18: Twenty liters of deionized water was added to a clean, glass lined ten gallon reactor. The system was sparged with a nitrogen stream for one hour to remove oxygen. To the closed reactor was added 3.4 kg. of chlorotrifluoroethylene and 120 g. vinylidene fluoride. The reactor contents were warmed to 45° C. and while stirring efficiently, the polymerization was initiated by concurrently pumping solution of 6.75g of 70% aqueous t-butylhydroperoxide in 100 ml of purified water and 5.7 g sodium metabisulfite plus 1.8 g. $FeSO_4 \cdot 7H_2O$ in 200 ml purified water over a 15 minute period. During the course of the polymerization solutions of 36g 70% aqueous t-butylhydroperoxide in 500 ml of purified water and 27.9 g sodium metabisulfite plus 0.75g. $FeSO_4 \cdot 7H_2O$ in 500 ml of purified water were pumped into the reactor concurrently at the rate of 50 ml/hr. The initial reactor pressure was about 180 psi. There was a slight exotherm due to the polymerization reaction causing a temperature rise to 46° C. and a pressure increase to 185 psi. The polymerization temperature was controlled to 45° C. ±1° C. by circulating tempered water through the reactor jacket. At 1.1 hours and 3.5 hours, after observing a 10 psi drop in reactor pressure, additional monomers, 3.45 kg chlorotrifluoroethylene plus 110 g vinylidene fluoride and 2.2 kg. chlorotrifluoroethylene plus 70 g vinylidene fluoride respectively, were added to the reactor. After 5.2 hours, the reactor pressure had dropped to 70 psi and the pumping of the sodium metabisulfite solution into the reactor was terminated. The t-butylhydroperoxide solution was continued for 0.5 hours to ensure complete reaction of any sodium bisulfite in the reaction mixture. The reactor was vented and swept with a nitrogen stream to remove any unreacted chlorotrifluoroethylene. The polymer was in suspension as submicron particles. The reaction mixture plus two gallons of rinse water had a polymer content of about 25% by weight.

The polymer was recovered from a 500 ml aliquot by coagulating, while stirring, by the addition of 1 ml of conc. $H_2SO_4$. The coagulated polymer was stirred for 1 hour and the polymer was recovered by centrifuging. The centrifuge cake was washed with one liter of purified water plus two ml conc. $H_2SO_4$, one liter of purified water, two liters of purified water plus four grams of sodium bicarbonate, and then six liters of purified water. The polymer was dried overnight at 95° C. in a circulating air oven. A white powdery polymer was recovered (110g) which had an intrinsic viscosity of 0.67 and a melt viscosity of $1.2 \times 10^5$ Pa-seconds.

It will be appreciated that the instant specification and examples set forth herein are by way of illustration and not limitation, and that various modifications and changes may be made without departing from the spirit and scope of the present invention, whose limitations are bounded only by the appendant claims.

We claim:

1. A process for forming stable, aqueous suspensions of poly(chlorotrifluoroethylene) or a copolymer of chlorotrifluoroethylene and at least one copolymerizable monomer which comprises:

(a) forming a polymerization reaction mixture comprising a monomer selected from the group consisting of chlorotrifluoroethylene or a combination of chlorotrifluoroethylene and at least one copolymerizable monomer and a redox initiator system comprising a mixture of an alkyl hydroperoxide and an alkali metal metabisulfite in a reaction solvent comprising water; and (b) polymerizing said monomer in the absence of a soap or a surfactant while maintaining said mixture at a controlled temperature between about 0° C., and 75° C. to form a stable aqueous suspension of said poly(chlorotrifluoroethylene) or said copolymer.

2. The process according to claim 1 wherein said redox initiator system comprises tert-butyl hydroperoxide and sodium metabisulfite.

3. The process according to claim 1 which comprises:

(a) charging said monomer to a reactor vessel;

TABLE 3

| | | | 10 gallon reactor | | | | | | |
|---|---|---|---|---|---|---|---|---|---|
| | | | Temp | TBH | | MBS | | Reaction | Pressure (psi) |
| Example: | CTFE (kg) | VF2 (g)* | (deg. C.) | initial: | g/hr: | initial:. | g/hr. | Time (hrs): | initial: final: |
| 15 | 6.82 | 25 | 41 | 1.05 | 0.1 | 1.22 | 0.12 | 5 | 174  70 |
| 16 | 7.32 | 0 | 10 | 0.52 | 0.2 | 0.61 | 0.29 | 23 | 52  38 |
| 17 | 7.28 | 0 | 10 | 0.36 | 0.01 | 0.43 | 0.11 | 30 | 54  54 |

*: "VF2" is vinylidine fluoride

TABLE 4

| | | 10 gallon reactor | | | | | |
|---|---|---|---|---|---|---|---|
| Example: | Coagulant type: | Polymer recovered (g) | Intrinsic Viscosity: | Ash cont.: (ppm) | Mw + $(1 \times 10^3)$ | Mn ++ $(1 \times 10^3)$ | Hete.*+ Index: |
| 15a | C | 454 | 1.3 | 84 | 570 | 190 | 3 |
| 15b | D | 405 | 1.26 | 51 | 580 | 190 | 3.1 |
| 15c | B | 459 | 1.3 | 44 | 580 | 220 | 2.64 |
| 16 | C | 414 | 0.93 | <35 | 550 | 130 | 6.9 |
| 17 | B | 371 | 1.1 | <25 | 550 | 120 | 709 |

+: Mw is weight average molecular weight
++: Mn is number average molecular weight
*+: Heterogeneity Index = Mw/Mn (b) charging to said reactor vessel said redox initiator system and maintaining a controlled temperature throughout the reaction process; and (c) allowing the reaction to proceed to form said poly(chlorotrifluoroethylene) or said copolymer.

4. The process according to claim 1 wherein said copolymer is a copolymer of chlorotrifluoroethylene and a least one comonomer selected from the group consisting of vinylidene fluoride, tetrafluoroethylene and ethylene.

5. The process according to claim 1 wherein said temperature is maintained between about 5° and about 60° C.

6. The process according to claim 1 wherein polymerization takes place in the presence of iron ions.

7. The process according to claim 6 wherein said iron ions are present in an amount of from about 10 to 1000 ppm based on the weight of the resulting polymer.

8. The process according to claim 7 wherein said iron ions are charged to said reactor vessel together with said redox initiator system.

9. The process according to claim 1 wherein said reaction mixture comprises a monomer consisting of chlorotrifluoroethylene.

10. The process according to claim 1 wherein said reaction mixture comprises chlorotrifluoroethylene and vinylidene fluoride.

11. The process according to claim 1 further including coagulating said suspension, filtering the resultant coagulant and washing said coagulant, to thereby form a precipitate of said poly(chlorotrifluoroethylene) or said copolymer.

12. The process according to claim 11 further including drying said precipitate.

* * * * *